United States Patent
Liu et al.

(10) Patent No.: US 10,454,588 B1
(45) Date of Patent: Oct. 22, 2019

(54) BAND-MULTIPLEXED PASSIVE OPTICAL NETWORKS (PONS)

(71) Applicant: Futurewei Technologies, Inc., Plano, TX (US)

(72) Inventors: Xiang Liu, Marlboro, NJ (US); Huaiyu Zeng, Red Bank, NJ (US); Andy Shen, Morganville, NJ (US); Frank Effenberger, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/966,795

(22) Filed: Apr. 30, 2018

(51) Int. Cl.
*H04J 14/02* (2006.01)
*H04B 10/516* (2013.01)
(Continued)

(52) U.S. Cl.
CPC ....... *H04B 10/5161* (2013.01); *H04B 10/504* (2013.01); *H04L 12/2861* (2013.01); *H04L 12/2885* (2013.01)

(58) Field of Classification Search
CPC .. H04J 14/025; H04J 14/0252; H04B 10/5161
See application file for complete search history.

(56) References Cited

U.S. PATENT DOCUMENTS

2006/0115271 A1* 6/2006 Hwang ............... H04J 14/0226
398/72
2007/0269213 A1* 11/2007 Pratt ...................... H04B 10/27
398/66
(Continued)

FOREIGN PATENT DOCUMENTS

CN 102611668 A 7/2012
CN 102833206 A 12/2012
(Continued)

OTHER PUBLICATIONS

Liu, et al, "Reduced Power Consumption for Digital Signal Processing (DSP)-Based Reception in Time-Division Multiplexing (TDM) Passive Optical Networks (PONs)," U.S. Appl. No. 15/916,060, filed Mar. 8, 2018, 34 pages.
(Continued)

*Primary Examiner* — Shi K Li
(74) *Attorney, Agent, or Firm* — Conley Rose, P.C.

(57) ABSTRACT

An apparatus comprises a DAC configured to convert a digital electrical signal to an analog electrical signal and a laser coupled to the DAC. The laser is configured to generate an optical signal using the analog electrical signal for modulation, the optical signal is a band-multiplexed optical signal comprising frequency bands, the frequency bands comprise a lowest-frequency band, and the lowest-frequency band comprises a baseband IM signal. The laser is configured to transmit the optical signal. A PON comprises an OLT configured to transmit a downstream optical signal, the downstream optical signal is a band-multiplexed optical signal comprising a first band and a second band. The PON includes a first ONU configured to receive the downstream optical signal and equalize only the first band; and a second ONU configured to receive the downstream optical signal and equalize the first band and the second band.

21 Claims, 12 Drawing Sheets

(51) Int. Cl.
*H04L 12/28* (2006.01)
*H04B 10/50* (2013.01)

(56) References Cited

U.S. PATENT DOCUMENTS

| | | | | |
|---|---|---|---|---|
| 2011/0074518 A1* | 3/2011 | Kojima | ................ | H04L 27/362 |
| | | | | 332/149 |
| 2012/0321320 A1 | 12/2012 | Yu | | |
| 2013/0094861 A1* | 4/2013 | Luo | .................... | H04J 14/0278 |
| | | | | 398/68 |
| 2014/0169501 A1* | 6/2014 | Nazarathy | .......... | H03H 17/0266 |
| | | | | 375/316 |
| 2014/0199074 A1* | 7/2014 | Cho | ..................... | H04B 10/548 |
| | | | | 398/79 |
| 2015/0086215 A1* | 3/2015 | Chen | .................. | H04B 10/2507 |
| | | | | 398/136 |
| 2016/0099777 A1* | 4/2016 | Liu | .................... | H04B 10/2513 |
| | | | | 398/159 |
| 2016/0112238 A1* | 4/2016 | Ling | ...................... | H04B 10/50 |
| | | | | 375/261 |
| 2016/0352427 A1* | 12/2016 | Anandakumar | ... | H04B 10/2507 |

FOREIGN PATENT DOCUMENTS

| | | | |
|---|---|---|---|
| EP | 2670103 | A1 | 12/2013 |
| WO | 2017027042 | A1 | 2/2017 |
| WO | 2017078173 | A1 | 5/2017 |

OTHER PUBLICATIONS

Machine Translation and Abstract of Chinese Publication No. CN102833206, Dec. 19, 2012, 17 pages.
Foreign Communication From a Counterpart Application, PCT Application No. PCT/CN2019/083873, English Translation of International Search Report dated Jun. 28, 2019, 5 pages.
Foreign Communication From a Counterpart Application, PCT Application No. PCT/CN2019/083873, English Translation of Written Opinion dated Jun. 28, 2019, 4 pages.

* cited by examiner

BAND-MULTIPLEXED PASSIVE OPTICAL NETWORKS (PONS)

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The disclosure is related to the technical field of PONs, and more specifically, to band-multiplexed PONs.

BACKGROUND

A PON is one system for providing network access over the last mile, which is the final portion of a telecommunications network that delivers communication to customers. A PON is a P2MP network comprising an OLT at a CO, ONUs at the user premises, and an ODN coupling the OLT to the ONUs. PONs may also comprise RNs located between the OLTs and the ONUs, for instance at the end of roads where multiple customers reside.

SUMMARY

In one embodiment, the disclosure includes an apparatus comprising: a DAC configured to convert a digital electrical signal to an analog electrical signal; and a laser coupled to the DAC and configured to: generate an optical signal using the analog electrical signal for modulation, the optical signal is a band-multiplexed optical signal comprising frequency bands, the frequency bands comprise a lowest-frequency band, and the lowest-frequency band comprises a baseband IM signal, and transmit the optical signal. In some embodiments, the apparatus further comprises a DSP, wherein the DSP comprises a band multiplexer coupled to the DAC and configured use a TDM signal to perform band multiplexing to create the digital electrical signal; the band multiplexer comprises sub-band filters configured to create band signals for the frequency bands using digital filtering; the DSP further comprises a TDM component coupled to the band multiplexer and configured to multiplex modulated signals to create the TDM signal; the DSP further comprises a modulator coupled to the TDM component and configured to modulate corrected data streams to create the modulated signals; the modulator uses NRZ modulation or PAM-4 for the lowest-frequency band, wherein the frequency bands further comprise higher-frequency bands, and wherein the modulator uses QAM for the higher-frequency bands; the DSP further comprises an FEC component configured to perform FEC on data streams to create the corrected data streams; the DSP further comprises a data generator configured to generate the data streams; the frequency bands are orthogonal to each other; the apparatus is an OLT; the apparatus is an ONU.

In another embodiment, the disclosure includes a method comprising: converting a digital electrical signal to an analog electrical signal; generating an optical signal using the analog electrical signal for modulation, the optical signal is a band-multiplexed optical signal comprising bands, the bands comprise a lowest-frequency band, and the lowest-frequency band comprises a baseband IM signal; and transmitting the optical signal. In some embodiments, an OLT implements the method; an ONU implements the method.

In yet another embodiment, the disclosure includes an ONU comprising: a receiver comprising: a PD configured to receive a downstream optical signal from an OLT, the downstream optical signal is a first band-multiplexed optical signal comprising m first bands, m is a first positive integer, the first bands comprise a first lowest-frequency band, and the first lowest-frequency band comprises a first baseband IM signal, and a TIA configured to provide for a class n bandwidth with the PD, n is a second positive integer that is less than or equal to m; and a transmitter comprising a band multiplexer configured to transmit an upstream optical signal towards the OLT, the upstream optical signal is a second band-multiplexed optical signal comprising n second bands, the second bands comprise a second lowest-frequency band, and the second lowest-frequency band comprises a second baseband IM signal. In some embodiments, the first baseband IM signal is a first NRZ signal or a first PAM-4 signal, and wherein the second baseband IM signal is a second NRZ signal or a second PAM-4 signal; the first bands comprise a first higher-frequency band, wherein the first higher-frequency band comprises a first QAM signal, wherein the second bands comprise a second higher-frequency band, and wherein the second higher-frequency band comprises a second QAM signal.

In yet another embodiment, the disclosure includes a PON comprising: an OLT configured to transmit a downstream optical signal, the downstream optical signal is a band-multiplexed optical signal comprising a first band and a second band; a first ONU configured to: receive the downstream optical signal, and equalize only the first band; and a second ONU configured to: receive the downstream optical signal, and equalize the first band and the second band. In some embodiments, the first ONU is further configured to transmit a first upstream optical signal towards the OLT using TDMA, wherein the first upstream optical signal comprises a third band, wherein the first upstream optical signal is centered at a wavelength, wherein the second ONU is further configured to transmit a second upstream optical signal towards the OLT using TDMA, wherein the second upstream optical signal comprises a fourth band and a fifth band, wherein the second upstream optical signal is centered at the wavelength, and wherein the OLT is further configured to receive the first upstream optical signal and the second upstream optical signal at different times via the TDMA; the first ONU is further configured to transmit a first upstream optical signal towards the OLT, wherein the first upstream optical signal comprises a third band, wherein the first upstream optical signal is centered at a first wavelength, wherein the second ONU is further configured to transmit a second upstream optical signal towards the OLT using TDMA, wherein the second upstream optical signal comprises a fourth band and a fifth band, and wherein the second upstream optical signal is centered at a second wavelength.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ADC: analog-to-digital converter
ASIC: application-specific integrated circuit
BER: bit error rate
CO: central office
CPU: central processing unit
DAC: digital-to-analog converter
dB: decibel(s)
DD: direct detection
DML: directly-modulated laser
DSP: digital signal processor
EO: electrical-to-optical
FEC: forward error correction
FPGA: field-programmable gate array
Gb/s: gigabit(s)/per second
IM: intensity modulation
MB: multi-band
NRZ: non-return-to-zero
ODN: optical distribution network
OE: optical-to-electrical
OLT: optical line terminal
ONU: optical network unit
PAM: pulse-amplitude modulation
PAM-4: four-level PAM
PD: photodiode
PON: passive optical network
PSC: parallel-to-serial converter
P2MP: point-to-multipoint
QAM: quadrature amplitude modulation
RAM: random-access memory
RF: radio frequency
RN: remote node
ROM: read-only memory
RX: receiver unit
SNR: signal-to-noise ratio
SPC: serial-to-parallel converter
SRAM: static RAM
TCAM: ternary content-addressable memory
TDM: time-division multiplexing
TDMA: time-division multiple access
TIA; transimpedance amplifier
TX: transmitter unit
WDM: wavelength-division multiplexer.

Figure 1:
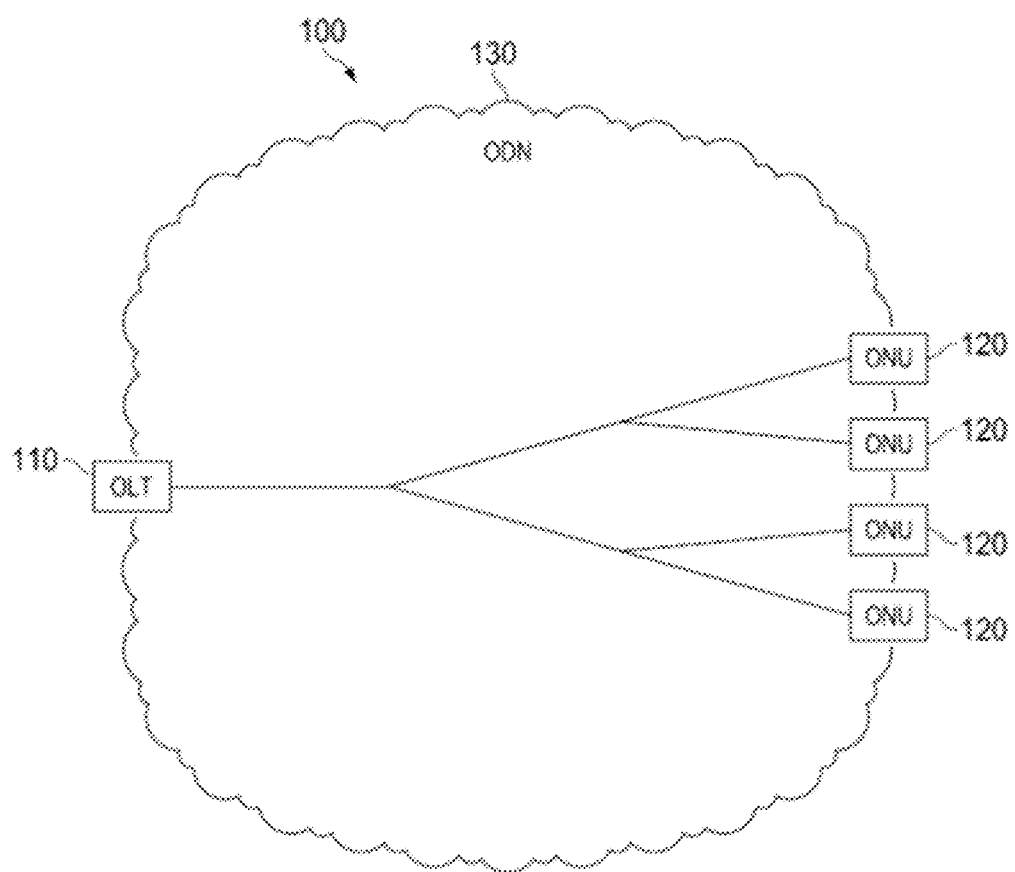
FIG. 1 is a schematic diagram of a PON.

FIG. 1 is a schematic diagram of a PON 100. The PON 100 comprises an OLT 110, ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with another network and the ONUs 120. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution network that comprises optical fiber cables, couplers, splitters, distributors, and other suitable components. The components include passive optical components that do not require power to distribute signals between the OLT 110 and the ONUs 120. Alternatively, the components include active components such as optical amplifiers that do require power. The ODN 130 extends from the OLT 110 to the ONUs 120 in a branching configuration as shown, but the ODN 130 may be configured in any other suitable P2MP configuration.

The ONUs 120 communicate with the OLT 110 and customers and act as intermediaries between the OLT 110 and the customers. For instance, the ONUs 120 forward data from the OLT 110 to the customers and forward data from the customers to the OLT 110. The ONUs 120 comprise optical transceivers that receive optical signals from the OLT 110, convert the optical signals into electrical signals, and provide the electrical signals to the customers. The transceivers also receive electrical signals from the customers, convert the electrical signals into optical signals, and transmit the optical signals to the OLT 110. ONUs 120 and ONTs are similar, and the terms may be used interchangeably. The ONUs 120 are typically located at distributed locations such as customer premises, but they may also be located at other suitable locations.

Internet service customers are demanding increased bandwidths, which PON standards are attempting to provide for. Typically, when a bandwidth of the PON 100 increases, both speed and complexity of the OLT 110 and the ONUs 120 must increase. Faster, more complex ONUs 120 result in faster, more expensive services. Many customers accept the resulting increased costs of such services. However, some customers prefer slower, cheaper services with slower, simpler ONUs 120. It is therefore desirable to provide options for both faster, more expensive services and slower, cheaper services.

Disclosed herein are embodiments for band-multiplexed PONs. The disclosed embodiments provide ONUs of different classes by varying components of receivers and transmitters in the ONUs. The components may be the optical components, which are typically the most expensive. Thus, there may be both slower, cheaper services with slower, simpler ONUs and faster, more expensive services with faster, more complex ONUs. The disclosed embodiments accommodate the classes by using band multiplexing. The bands comprise frequency ranges and are orthogonal to each other. TDMA may accompany the band multiplexing. A band-multiplexed PON according to any embodiment of this disclosure allows some ONUs in a high-speed PON to use lower-speed optics than other ONUs. The ability to use lower-speed ONUs provides a lower-cost option for some users. The band-multiplexed PON according to any embodiment of this disclosure allows some ONUs to only receive the lowest frequency band, such that their receiver bandwidth requirements are relaxed in relation to other ONUs. The band-multiplexed PON according to any embodiment of this disclosure allows other ONUs to receive all the bands to achieve a highest peak speed. The band-multiplexed PON according to any embodiment of this disclosure allows various ONUs to receive various classes of bands to meet their respective bandwidth needs.

Figure 2:
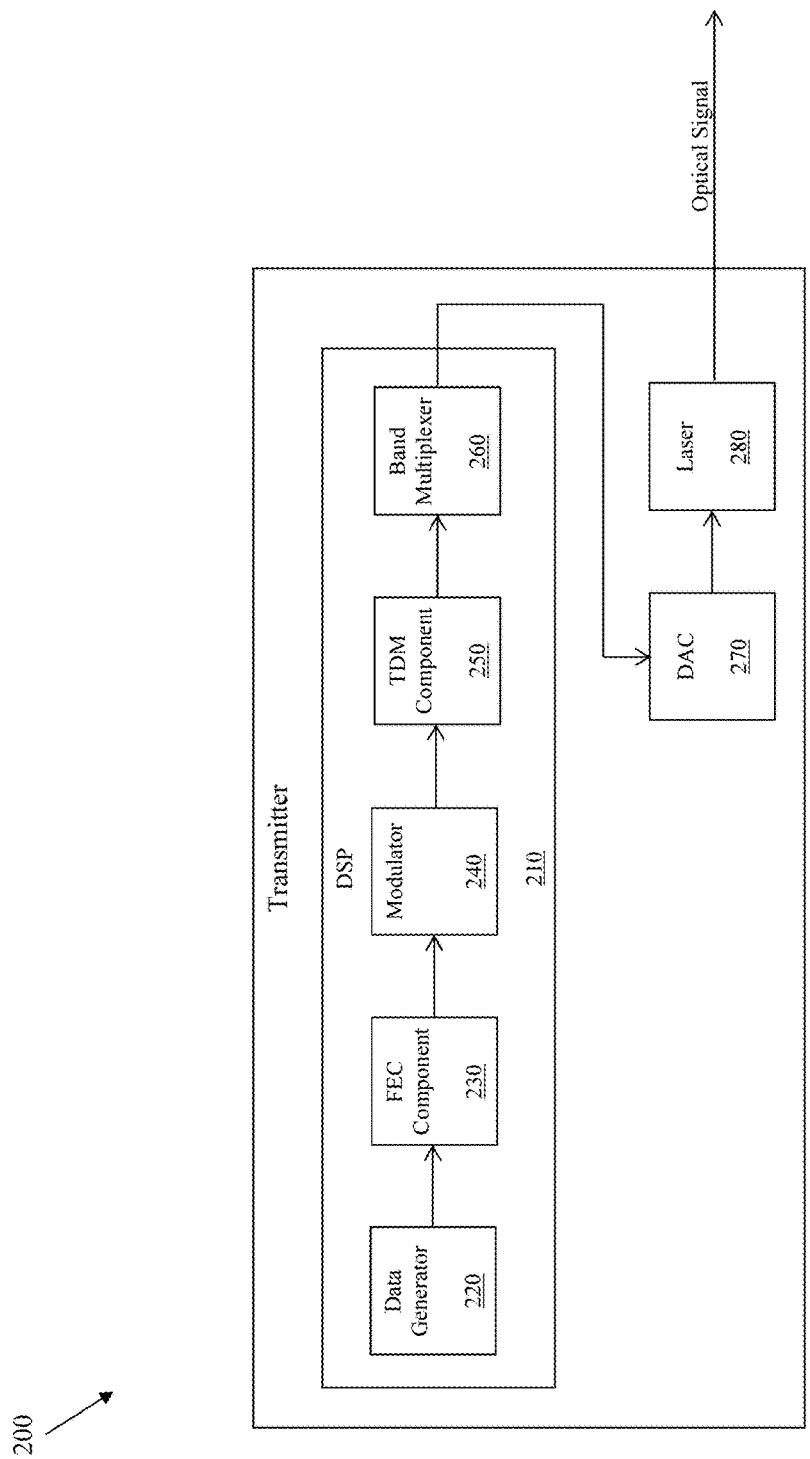
FIG. 2 is a schematic diagram of a transmitter according to an embodiment of the disclosure.

FIG. 2 is a schematic diagram of a transmitter 200 according to an embodiment of the disclosure. The transmitter is in the OLT 110 in FIG. 1 or the ONUs 120 in FIG. 1. The transmitter 200 comprises a DSP 210, a DAC 270, and a laser 280. The DSP 210 comprises a data generator 220, an FEC component 230, a modulator 240, a TDM component 250, and a band multiplexer 260.

In operation, in the DSP 210, the data generator 220 generates data streams, the FEC component 230 performs FEC on the data streams to create corrected data streams, the modulator 240 modulates the corrected data streams to create modulated signals, the TDM component 250 multiplexes the modulated signals using TDM to create a TDM signal, and the band multiplexer 260 uses the TDM signal to perform band multiplexing to create a digital electrical signal, which is a band-multiplexed optical signal. The modulator 240 uses modulation described below. The band multiplexer 260 is described further below. The bands comprise frequency ranges and are orthogonal to each other. The DAC 270 converts the digital electrical signal to an analog electrical signal. Using the analog electrical signal for modulation, the laser 280 generates an optical signal. Finally, the laser 280 transmits the optical signal towards a receiver, which is described below. The laser 280 may be a DML. The laser 280 receives analog electrical signal for modulation, wherein the laser modulates and outputs a modulated optical signal. In some embodiments, the laser 280 generates an IM optical signal. In some embodiments, the laser 280 generates an IM MB optical signal. In some embodiments, the IM MB signal is formed by orthogonal band multiplexing.

Figure 3:
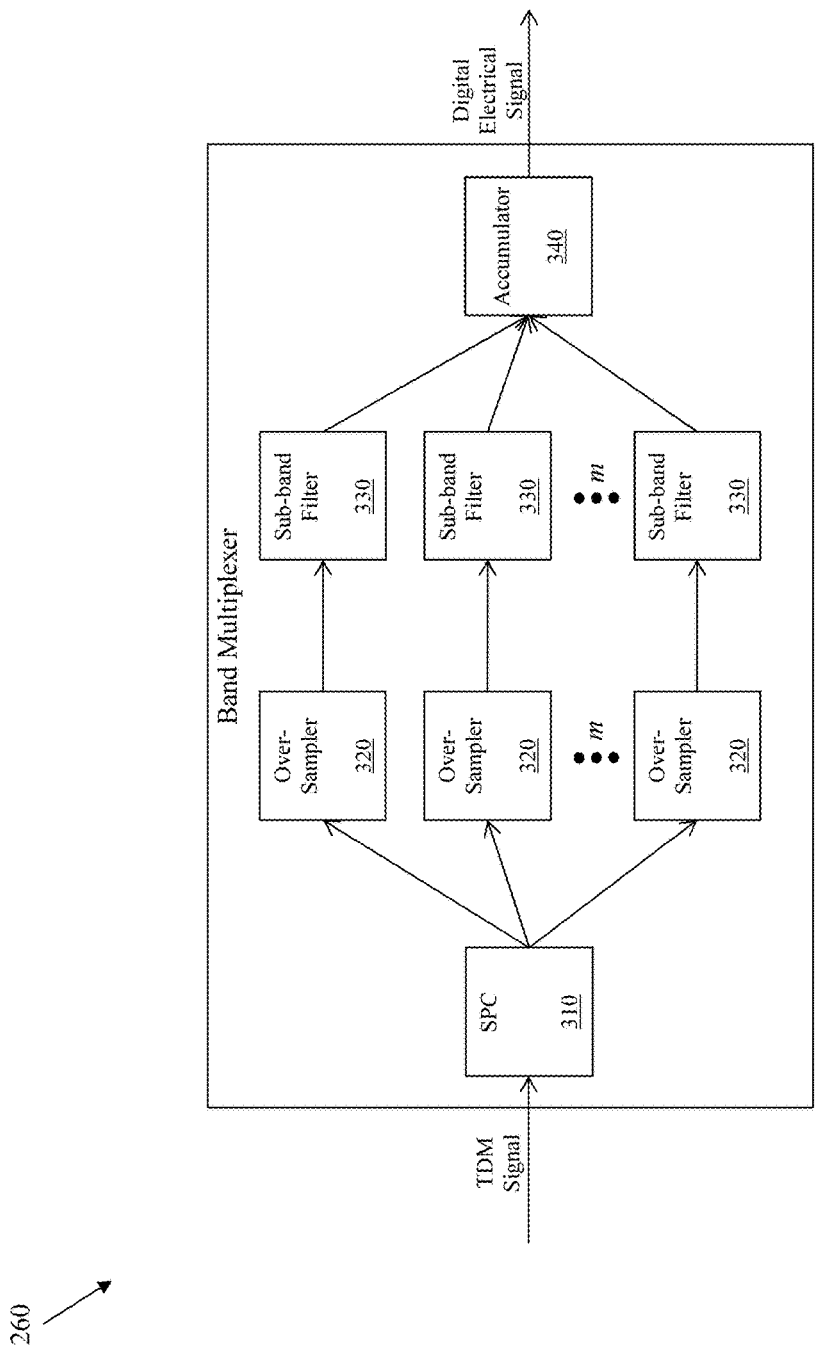
FIG. 3 is a schematic diagram of the band multiplexer in the transmitter of FIG. 2 according to an embodiment of the disclosure.

FIG. 3 is a schematic diagram of the band multiplexer 260 in the transmitter 200 of FIG. 2 according to an embodiment of the disclosure. The band multiplexer 260 comprises an SPC 310, m over-samplers 320, m sub-band filters 330, and an accumulator 340. M is a positive integer.

In operation, the SPC 310 separates the TDM signal described above to produce m parallel signals. For instance, if m is four and the TDM signal is a 50 Gb/s signal, then the SPC 310 separates the TDM signal to produce four 12.5 Gb/s parallel signals. The over-samplers 320 over-sample the parallel signals m times a base rate to produce over-sampled signals. The sub-band filters 330 digitally filter the over-sampled signals according to their filter responses to create band signals for the bands. A first sub-band filter 330 comprises a first filter response $h_1$, a second sub-band filter 330 comprises a second filter response $h_2$, and so on until a last sub-band filter 330 comprises an mth filter response $h_m$. Finally, the accumulator 340 combines the band signals to create the digital electrical signal described above.

Figure 4:
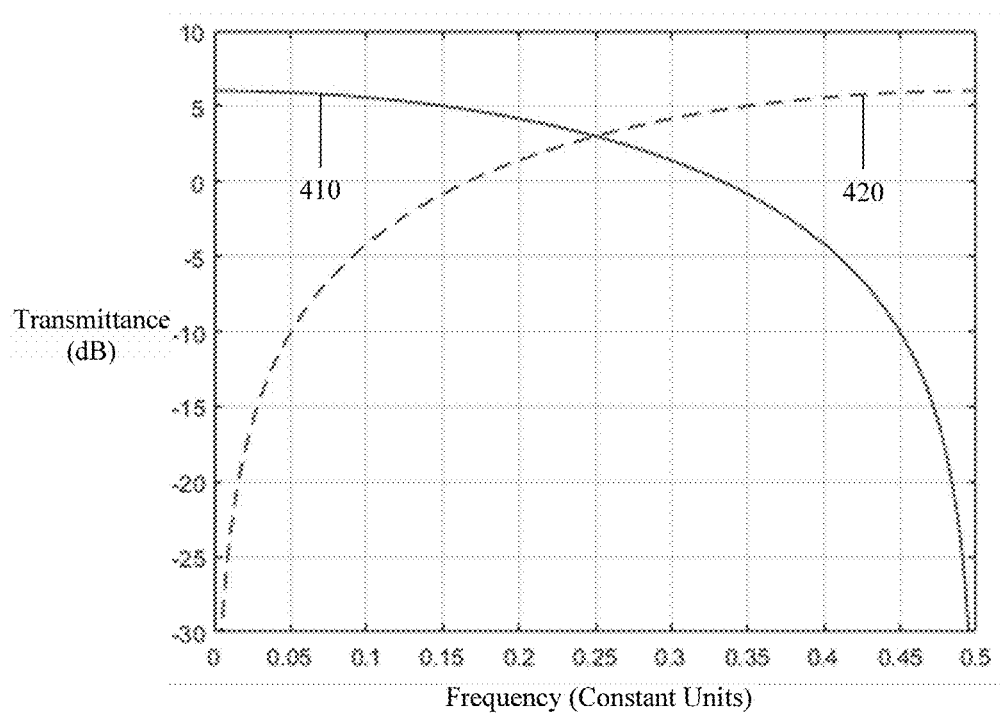
FIG. 4 is a graph illustrating a sub-band filter design according to an embodiment of the disclosure.

FIG. 4 is a graph 400 illustrating a sub-band filter design according to an embodiment of the disclosure. The x-axis represents frequency in constant units normalized to a modulation symbol rate, and the y-axis represents a transmittance in dB. The sub-band filter design implements two sub-band filters 330 so that m is 2. A curve 410 represents a first filter response of a first sub-band filter 330, and a curve 420 represents a second filter response of a second sub-band filter 330. The first filter response is a low-pass filter response, and the second filter response is a high-pass filter response. The first filter response and the second filter response may also be referred to as a first band and a second band, respectively. The first band and the second band are orthogonal to each other.

Figure 5:
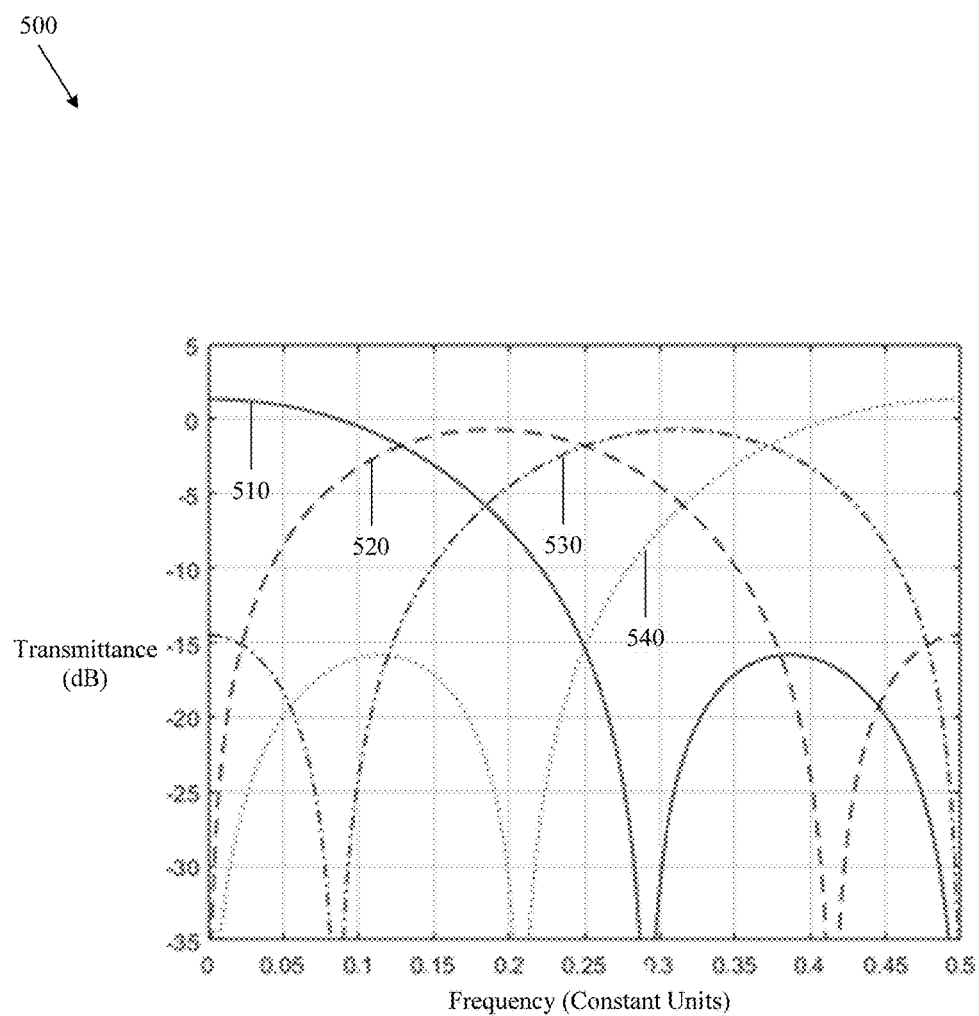
FIG. 5 is a graph illustrating a sub-band filter design according to another embodiment of the disclosure.

FIG. 5 is a graph 500 illustrating a sub-band filter design according to another embodiment of the disclosure. The x-axis represents frequency in constant units normalized to a modulation symbol rate, and the y-axis represents a transmittance in dB. The sub-band filter design implements four sub-band filters 330 so that m is 4. A curve 510 represents a first filter response of a first sub-band filter 330, a curve 520 represents a second filter response of a second sub-band filter 330, a curve 530 represents a third filter response of a third sub-band filter 330, and a curve 540 represents a fourth filter response of a fourth sub-band filter 330. The first filter response, the second filter response, the third filter response, and the fourth filter response may also be referred to as a first band, a second band, a third band, and a fourth band, respectively. The first band, the second band, the third band, and the fourth band are substantially orthogonal to each other.

In other PONs, one-dimensional modulation signals such as NRZ signals and PAM-4 signals provide for easy implementation, but require doubling a bandwidth needed for transmission. However, the sub-band filter designs illustrated in FIGS. 4-5 achieve similar bandwidth efficiency as single sideband modulation. In addition, the sub-band filter designs in FIGS. 4-5 combine a low-pass filter and a frequency up-converter into one sub-band filter. With NRZ signals and PAM-4 signals, digital signal processing associated with band multiplexing and de-multiplexing may be simpler because it need not comprise multipliers.

Figure 6:
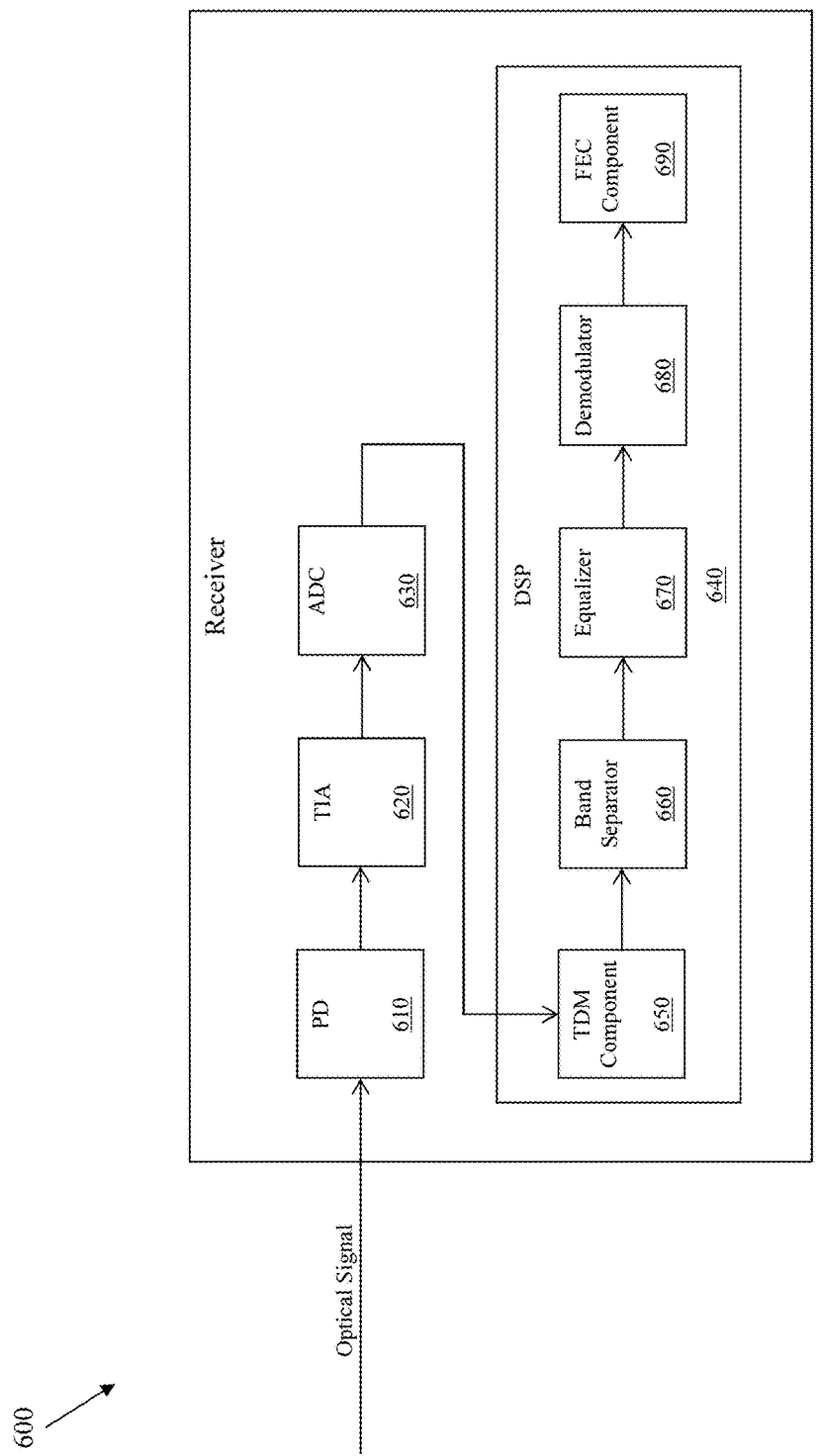
FIG. 6 is a schematic diagram of a receiver according to an embodiment of the disclosure.

FIG. 6 is a schematic diagram of a receiver 600 according to an embodiment of the disclosure. The receiver 600 is in the OLT 110 or the ONUs 120 in FIG. 1. The receiver 600 is a DD receiver and is a class n receiver. N is a positive integer with a maximum of m. Classes are described further below. The receiver 600 comprises a PD 610, a TIA 620, an ADC 630, and a DSP 640. The DSP 640 comprises a TDM component 650, a band separator 660, an equalizer 670, a demodulator 680, and an FEC component 690.

In operation, the PD 610 receives the optical signal described above and converts the optical signal into an analog electrical signal, the TIA 620 amplifies the electrical signal to create an amplified electrical signal, and the ADC 630 samples the amplified electrical signal to create a digital signal. The PD 610 and the TIA 620 provide for a class n bandwidth. In the DSP 640, the TDM component 650 extracts from the digital signal time components that are intended for the receiver 600 to create a timed signal, the band separator 660 extracts from the timed signal bands that are intended for the receiver 600 to create a banded signal, the equalizer 670 equalizes the banded digital signal to create an equalized signal, the demodulator 680 demodulates the equalized signal to create a demodulated signal, and the FEC component 690 performs FEC to create a corrected signal for further processing. The TDM component 650 may extract the time components as described in Xiang Liu, et al., "Reduced Power Consumption for Digital Signal Processing (DSP)-Based Reception in Time-Division Multiplexing (TDM) Passive Optical Networks (PONs)," U.S. patent application Ser. No. 15/916,060, Mar. 8, 2018 ("Liu"), which is incorporated by reference. Alternatively, positions of the TDM component 650 and the band separator 660 are switched. The band separator 660 extracts the bands based on the class, class n, of the receiver 600.

Figure 7:
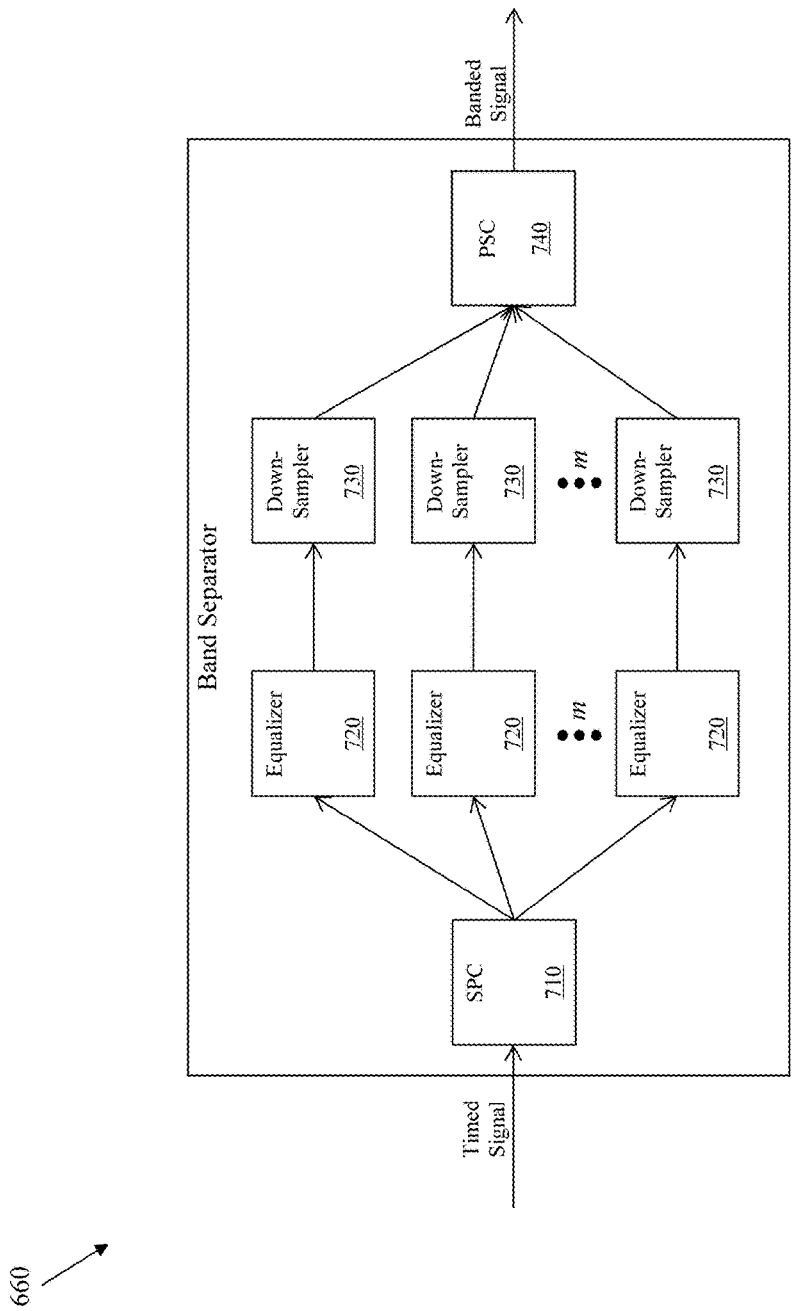
FIG. 7 is a schematic diagram of the band separator in the receiver of FIG. 6 according to an embodiment of the disclosure.

FIG. 7 is a schematic diagram of the band separator 660 in the receiver 600 of FIG. 6 according to an embodiment of the disclosure. The band separator 660 comprises an SPC 710, m equalizers 720, m down-samplers 730, and a PSC 740. Though m equalizers 720 and m down-samplers 730 are shown, when the receiver 600 is in one of the ONUs 120, the band separator 660 may have a number of equalizers 720 and down-samplers 730 corresponding to the class of the ONU 120. That number may be less than m, thus reducing complexity of the band separator 660. Alternatively, the band separator 660 the equalizers 720 are combined with the equalizer 670 in the receiver 600 in FIG. 6 to create a T/m fractionally-spaced equalizer, where T is a modulation symbol period.

In operation, the SPC 710 separates the time signal described above to produce m parallel signals. The equalizers 720 equalize the parallel signals to create equalized signals. The down-samplers 730 down-sample the equalized signals m times the base rate to produce down-sampled signals. Finally, the PSC 740 combines the down-sampled signals to create the banded signal described above.

The transmitter 200 in FIG. 2 and the receiver 600 in FIG. 6 implement at least three embodiments of ONU classes. Classes indicate numbers of bands used and thus bandwidth. For instance, a class 1 ONU 120 receives or transmits data using one band, a class 2 ONU 120 receives or transmits data using two bands, a class 3 ONU 120 receives or transmits data using three bands, and so on.

In a first embodiment of ONU classes, the transmitter 200 is in the OLT 110, the receiver 600 is in the ONUs 120, and the optical signal is a downstream optical signal. The downstream optical signal comprises multiple frequency bands, each band is separated into multiple TDM segments, and the TDM segments are intended for different ONUs 120. Thus, the downstream optical signal implements a two-dimensional mapping of frequency and time for each ONU 120. The ONUs 120 are of different classes. Because the downstream optical signal comprises multiple frequency bands, it may be referred to as a band-multiplexed optical signal, which is a specific type of aggregated signal. An aggregated data rate of the downstream optical signal may be about 50 Gb/s, and a data rate of each band may be about 12.5 Gb/s. A sub-band signal may comprise a lowest-frequency band, and the lowest-frequency band may comprise a baseband IM signal. The baseband IM signal may have NRZ modulation or PAM-4 modulation.

Figure 8:
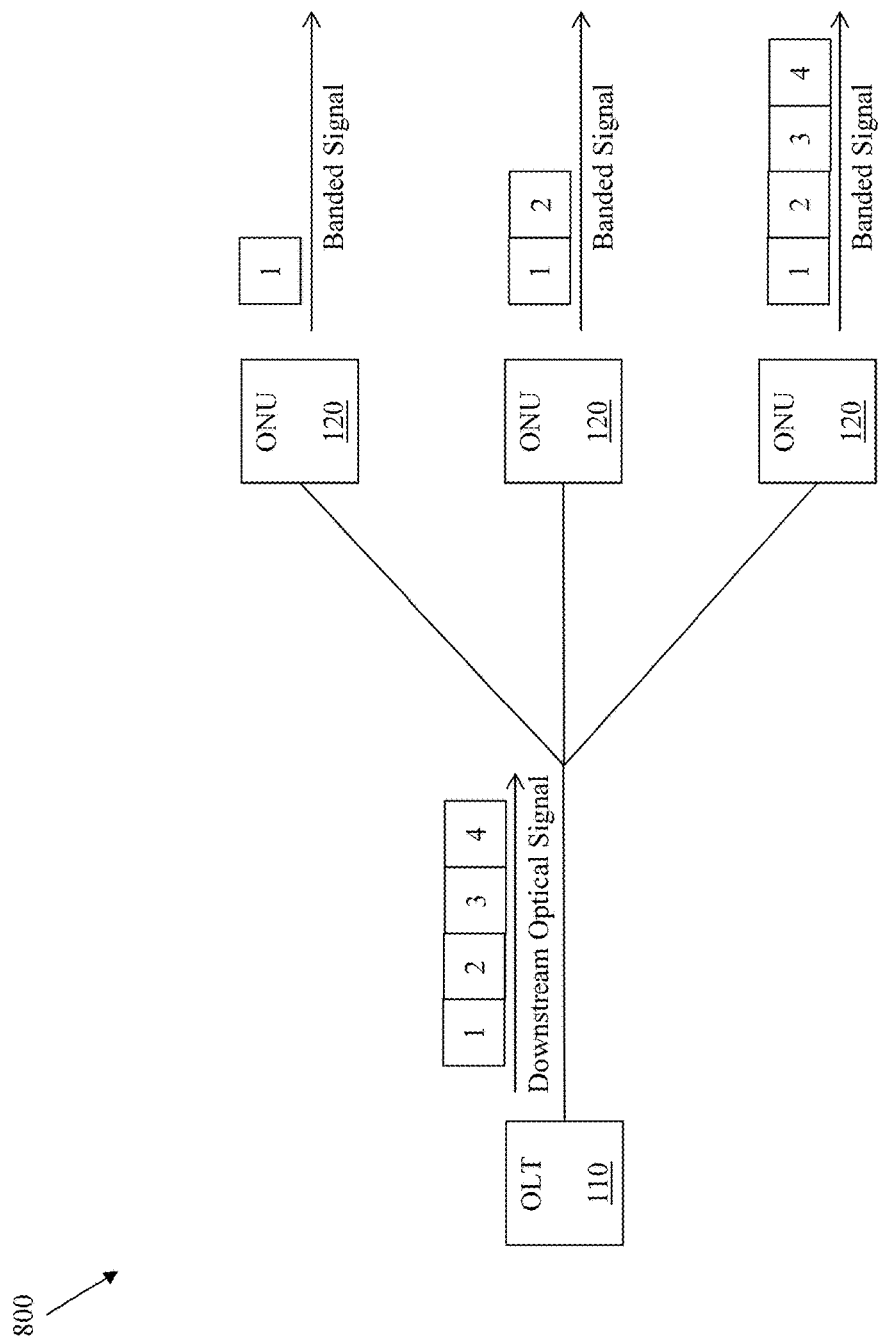
FIG. 8 is a schematic diagram of the PON implementing the third embodiment of ONU classes

FIG. 8 is a schematic diagram of the PON 800 implementing the first embodiment of ONU classes. The PON 800 comprises the OLT 110 and ONUs 120. A first ONU 120 is a class 1 ONU designed to receive a first band from the downstream optical signal; a second ONU 120 is a class 2 ONU designed to receive the first band and a second band from the downstream optical signal; and a third ONU 120 is a class 4 ONU designed to receive the first band, the second band, a third band, and a fourth band from the downstream optical signal. The first ONU 120 omits the band separator 660, while the second ONU 120 and the third ONU 120 include the band separator 660. Alternatively, the ONU 120 comprises the band separator 660 to remove residual energy from the second band, the third band, the fourth band, and any other bands and thus prevent crosstalk with those bands. For the receiver 600 to have an acceptable BER and SNR, the PD 610 and the TIA 620 require a lowest bandwidth in the first ONU 120, a medium bandwidth in the second ONU 120, and a highest bandwidth in the third ONU 120. The ADC 630 has a sample rate high enough to sample all four bands, so the ADC 630 is the same for the first ONU 120, the second ONU 120, and the third ONU 120. For those reasons, the first ONU 120 provides a slowest service using lowest-complexity and lowest-cost components, the second ONU 120 provides a medium service using medium-complexity and medium-cost components, and the third ONU 120 provides a fastest service using highest-complexity and highest-cost components.

In a second embodiment of ONU classes, the transmitter 200 is in the ONUs 120, the receiver 600 is in the OLT 110, and the optical signals are upstream optical signals. The upstream optical signals from the different ONUs 120 comprise different bands, comprise about the same center wavelength, and arrive at the OLT 110 without time overlap via TDMA. Thus, the upstream optical signals implement two-dimensional mappings of frequency and time for each ONU 120. The ONUs 120 are of different classes. Because the upstream optical signals comprise multiple frequency bands, they may be referred to as a band-multiplexed optical signal. An aggregated data rate of the upstream optical signals may be about 50 Gb/s. The transmitter 200 in each of the ONUs 120 may transmit IM signals, a lowest-frequency band with a lowest frequency range may comprise a baseband IM signal with NRZ modulation or PAM-4 modulation, and higher-frequency bands with higher frequency ranges may comprise pass-band signals with QAM and their complex conjugates.

Figure 9:
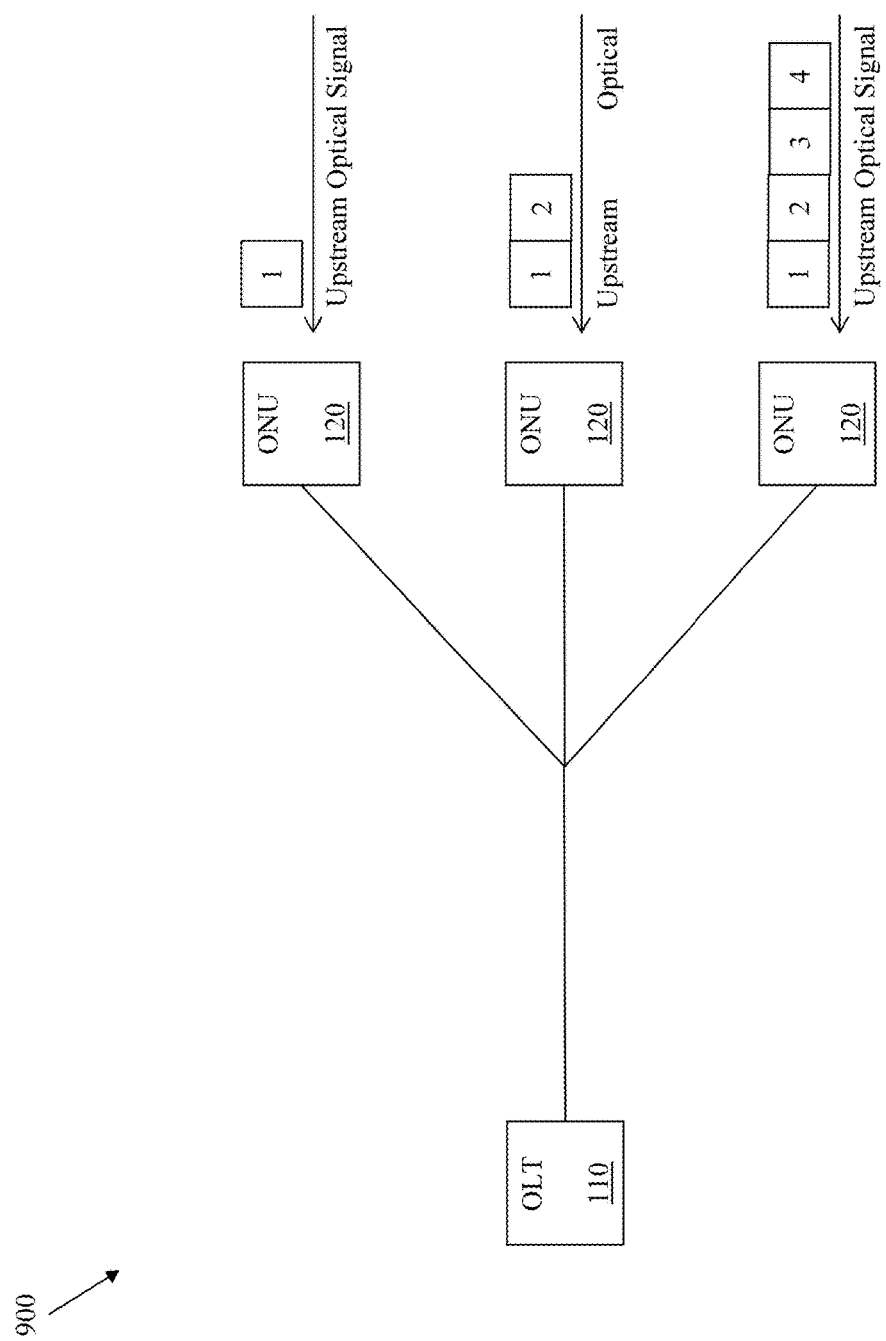
FIG. 9 is a schematic diagram of the PON implementing the third embodiment of ONU classes.

FIG. 9 is a schematic diagram of the PON 900 implementing the second embodiment of ONU classes. The PON 800 comprises the OLT 110 and ONUs 120. A first ONU 120 is a class 1 ONU designed to transmit a first band in a first upstream optical signal; a second ONU 120 is a class 2 ONU designed to transmit a first band and a second band in a second upstream optical signal; and a third ONU 120 is a class 4 ONU designed to transmit a first band, a second band, a third band, and a fourth band in a third upstream optical signal. The first ONU 120 may omit the band multiplexer 260, while the second ONU 120 and the third ONU 120 include the band multiplexer 260. The laser 280 requires a lowest bandwidth in the first ONU 120, a medium bandwidth in the second ONU 120, and a highest bandwidth in the third ONU 120. For those reasons, the first ONU 120 provides a slowest service using lowest-complexity and lowest-cost components, the second ONU 120 provides a medium service using medium-complexity and medium-cost components, and the third ONU 120 provides a fastest service using highest-complexity and highest-cost components.

In a third embodiment of ONU classes, the transmitter 200 is in the ONUs 120, the receiver 600 is in the OLT 110, and the optical signals are upstream optical signals. The upstream optical signals from the different ONUs 120 comprise the same or different bands, comprise the same or different center wavelengths, and arrive at the OLT 110 with or without time overlap via TDMA. Thus, the upstream optical signals implement two-dimensional mappings of frequency and time for each ONU 120. The ONUs 120 are of different classes. When the upstream optical signals comprise multiple frequency bands, they may be referred to as band-multiplexed optical signals. An aggregated data rate of the upstream optical signals may be about 50 Gb/s. The transmitter 200 in each of the ONUs 120 may transmit IM signals, a lowest-frequency band with a lowest frequency range may comprise a baseband IM signal with NRZ modulation or PAM-4 modulation, and higher-frequency bands with higher frequency ranges may comprise pass-band signals with QAM and their complex conjugates.

Figure 10:
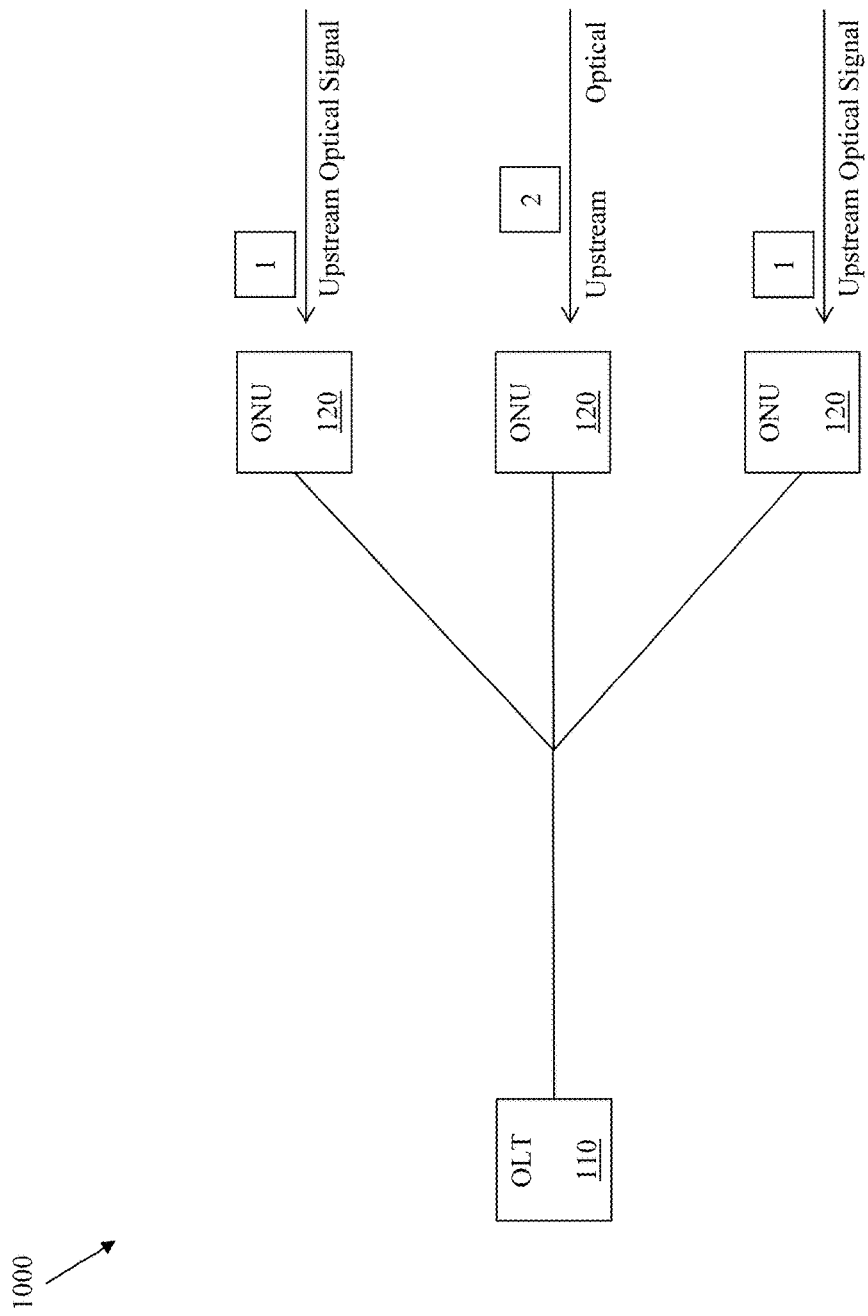
FIG. 10 is a schematic diagram of the PON implementing the third embodiment of ONU classes.

FIG. 10 is a schematic diagram of the PON 1000 implementing the third embodiment of ONU classes. The PON 1000 comprises the OLT 110 and ONUs 120. A first ONU 120 is a class 1 ONU designed to transmit a first band in a first upstream optical signal; a second ONU 120 is a class 1 ONU designed to transmit a second band in a second upstream optical signal; and a third ONU 120 is a class 1 ONU designed to transmit a first band in a third upstream optical signal. The first ONU 120 and the third ONU 120 transmit the first upstream optical signal and the third upstream optical signal, respectively, at different times in order to avoid time overlap. The second band has a different center wavelength from the first band, so the second ONU 120 may transmit the second upstream optical signal at the same time that the first ONU 120 transmits the first upstream optical signal or the third ONU 120 transmits the third upstream optical signal.

Figure 11:
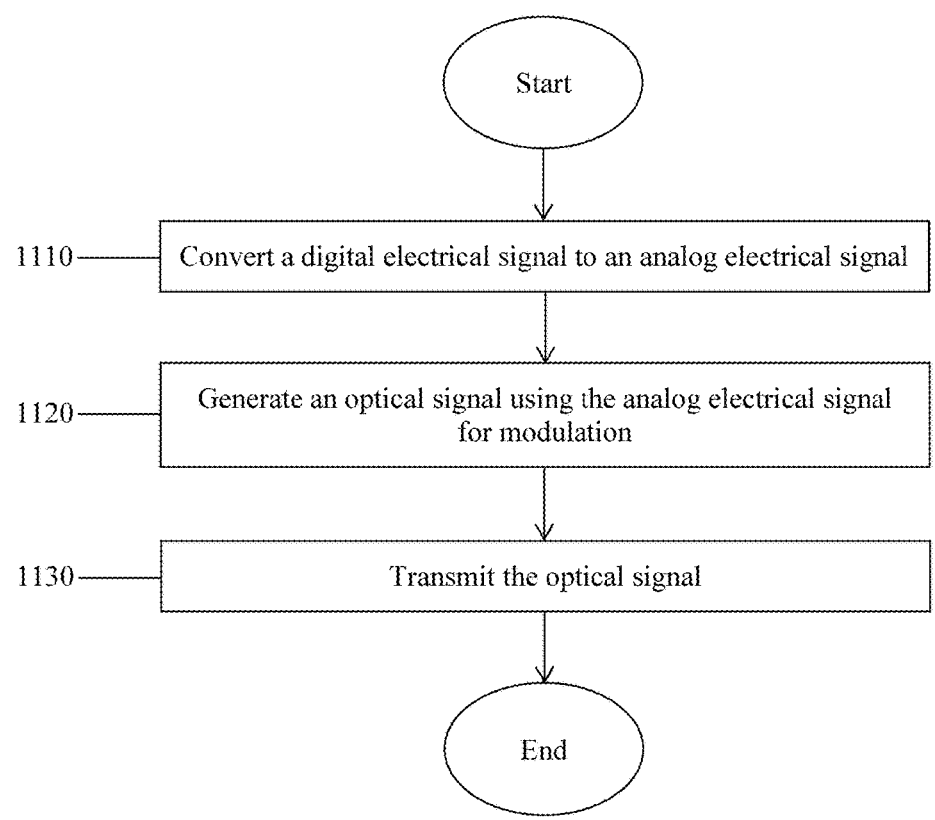
FIG. 11 is a flowchart illustrating a method of band-multiplexing according to an embodiment of the disclosure.

FIG. 11 is a flowchart illustrating a method 1100 of band-multiplexing according to an embodiment of the disclosure. The transmitter 200 implements the method. At step 1110, a digital electrical signal is converted to an analog electrical signal. For instance, the DAC 270 converts the digital electrical signal to the analog electrical signal. At step 1120, an optical signal is generated using the analog electrical signal for modulation. For instance, the laser 280 generates the optical signal. The optical signal is a band-multiplexed optical signal comprising bands. The bands comprise a lowest-frequency band, and the lowest-frequency band comprises a baseband IM signal. Finally, at step 1130, the optical signal is transmitted. For instance, the laser 280 is in the OLT 110 and transmits the optical signal towards the ONUs 120, or the laser 280 is in one of the ONUs 120 and transmits the optical signal towards the OLT 110.

Figure 12:
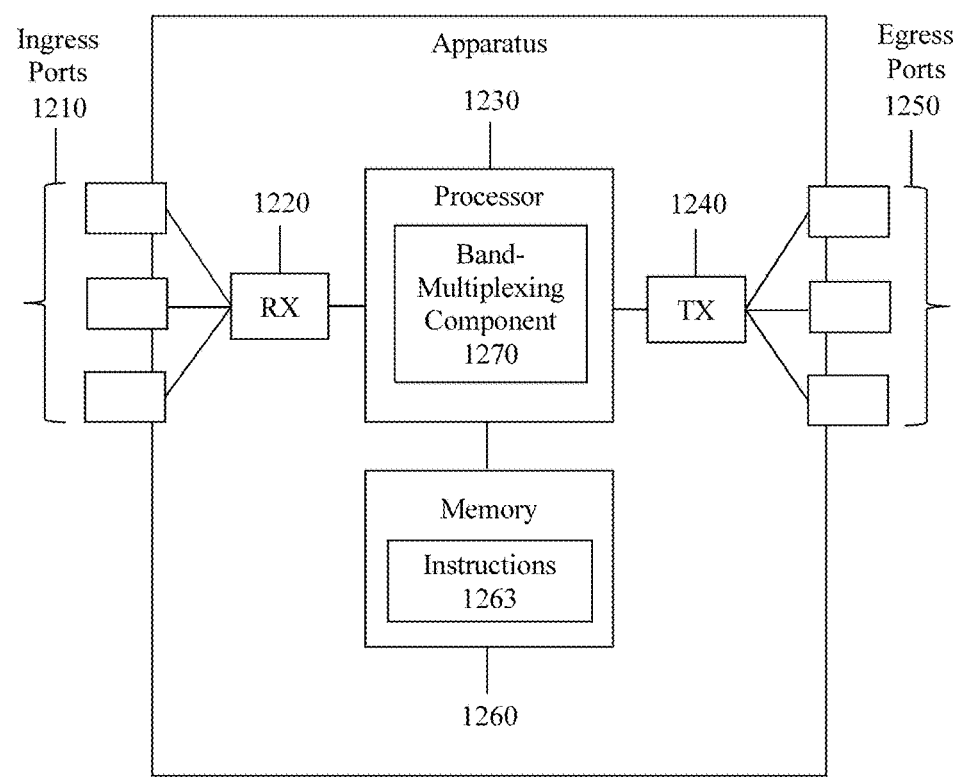
FIG. 12 is a schematic diagram of an apparatus according to an embodiment of the disclosure.

FIG. 12 is a schematic diagram of an apparatus 1200 according to an embodiment of the disclosure. The apparatus 1200 may implement the disclosed embodiments. The apparatus 1200 comprises ingress ports 1210 and an RX 1220 coupled to the ingress ports 1210 for receiving data; a processor, logic unit, baseband unit, or CPU 1230 coupled to the RX 1220 to process the data; a TX 1240 coupled to the processor 1230 and egress ports 1250 coupled to the TX 1240 for transmitting the data; and a memory 1260 coupled to the processor 1230 for storing the data. The apparatus 1200 may also comprise OE components, EO components, or RF components coupled to the ingress ports 1210, the RX 120, the TX 1240, and the egress ports 1250 for ingress or egress of optical, electrical signals, or RF signals.

The processor 1230 is any combination of hardware, middleware, firmware, or software. The processor 1230 comprises any combination of one or more CPU chips, cores, FPGAs, ASICs, or DSPs. The processor 1230 communicates with the ingress ports 1210, the RX 1220, the TX 1240, the egress ports 1250, and the memory 1260. The processor 1230 comprises a band-multiplexing component 1270, which implements the disclosed embodiments. The inclusion of the band-multiplexing component 270 therefore provides a substantial improvement to the functionality of the apparatus 1200 and effects a transformation of the apparatus 1200 to a different state. Alternatively, the memory 1260 stores the band-multiplexing component 1270 as instructions, and the processor 1230 executes those instructions.

The memory 1260 comprises any combination of disks, tape drives, or solid-state drives. The memory 1260 stores instructions 1263. The instructions 1263 can be accessed and executed by the processor 1230. The instructions 1263 can operate the apparatus 1200 when executed by the processor 1230. Further, the instructions 1263 can implement the band-multiplexing component 1270 when the instructions 1263 are executed by the processor 1230. The apparatus 1200 may use the memory 1260 as an over-flow data storage device to store programs when the apparatus 1200 selects those programs for execution and to store instructions and data that the apparatus 1200 reads during execution of those programs. The memory 1260 may be volatile or non-volatile and may be any combination of ROM, RAM, TCAM, or SRAM.

In an example embodiment, an apparatus comprises: a DAC element configured to convert a digital electrical signal to an analog electrical signal; and a laser element coupled to the DAC element and configured to: generate an optical signal using the analog electrical signal for modulation, the optical signal is a band-multiplexed optical signal comprising frequency bands, the frequency bands comprise a lowest-frequency band, and the lowest-frequency band comprises a baseband IM signal, and transmit the optical signal.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a digital-to-analog converter (DAC) configured to convert a digital electrical signal to an analog electrical signal; and
a laser coupled to the DAC and configured to:
generate an optical signal using the analog electrical signal for modulation, the optical signal is a band-multiplexed optical signal comprising frequency bands, the frequency bands comprise a lowest-frequency band and higher-frequency bands, the lowest-frequency band comprises a baseband intensity modulation (IM) signal that is intensity modulated at the laser and based on non-return-to-zero (NRZ) modulation, and
transmit the optical signal.

2. The apparatus of claim 1, further comprising a digital signal processor (DSP), wherein the DSP comprises a band multiplexer coupled to the DAC and configured to use a time-division multiplexing (TDM) signal to perform band multiplexing to create the digital electrical signal.

3. The apparatus of claim 2, wherein the band multiplexer comprises sub-band filters configured to create band signals for the frequency bands using digital filtering.

4. The apparatus of claim 2, wherein the DSP further comprises a TDM component coupled to the band multiplexer and configured to multiplex modulated signals to create the TDM signal.

5. The apparatus of claim 4, wherein the DSP further comprises a modulator coupled to the TDM component and configured to modulate corrected data streams to create the modulated signals.

6. The apparatus of claim 5, wherein the modulator uses the NRZ modulation for the lowest-frequency band and quadrature amplitude modulation (QAM) for the higher-frequency bands.

7. The apparatus of claim 5, wherein the DSP further comprises a forward error correction (FEC) component configured to perform FEC on data streams to create the corrected data streams.

8. The apparatus of claim 7, wherein the DSP further comprises a data generator configured to generate the data streams.

9. The apparatus of claim 1, wherein the frequency bands are orthogonal to each other.

10. The apparatus of claim 1, wherein the apparatus is an optical line terminal (OLT).

11. The apparatus of claim 1, wherein the apparatus is an optical network unit (ONU).

12. A method comprising:
converting a digital electrical signal to an analog electrical signal;
generating an optical signal using the analog electrical signal for modulation, the optical signal is a band-multiplexed optical signal comprising frequency bands, the frequency bands comprise a lowest-frequency band and higher-frequency bands, the lowest-frequency band comprises a baseband intensity modulation (IM) signal that is intensity modulated at a laser and based on non-return-to-zero (NRZ) modulation; and
transmitting the optical signal.

13. The method of claim 12, wherein an optical line terminal (OLT) implements the method.

14. The method of claim 12, wherein an optical network unit (ONU) implements the method.

15. An optical network unit (ONU) comprising:
a receiver comprising:
a photodiode (PD) configured to receive a downstream optical signal from an optical line terminal (OLT), the downstream optical signal is a first band-multiplexed optical signal comprising m first bands, m is a first positive integer, the first bands comprise a first lowest-frequency band, and the first lowest-frequency band comprises a first baseband intensity modulation (IM) signal, and
a transimpedance amplifier (TIA) configured to provide for a class n bandwidth with the PD, n is a second positive integer that is less than or equal to m; and
a transmitter comprising a band multiplexer configured to transmit an upstream optical signal towards the OLT,
the upstream optical signal is a second band-multiplexed optical signal comprising n second bands,
the second bands comprise a second lowest-frequency band, and
the second lowest-frequency band comprises a second baseband IM signal.

16. The ONU of claim 15, wherein the first baseband IM signal is a first non-return-to-zero (NRZ) signal or a first four-level pulse-amplitude modulation (PAM-4) signal, and wherein the second baseband IM signal is a second NRZ signal or a second PAM-4 signal.

17. The ONU of claim 16, wherein the first bands comprise a first higher-frequency band, wherein the first higher-frequency band comprises a first quadrature amplitude modulation (QAM) signal, wherein the second bands comprise a second higher-frequency band, and wherein the second higher-frequency band comprises a second QAM signal.

18. A passive optical network (PON) comprising:
an optical line terminal (OLT) configured to transmit a downstream optical signal, the downstream optical signal is a band-multiplexed optical signal comprising a first band and a second band;
a first optical network unit (ONU) comprising:
a first photodiode (PD) configured to receive the downstream optical signal, and
a first equalizer configured to equalize only the first band; and
a second ONU comprising:
a second PD configured to receive the downstream optical signal,
a second band separator configured to separate the first band from the second band, and
a second equalizer coupled to the second band separator and configured to equalize the first band and the second band.

19. The PON of claim 18, wherein the first ONU is further configured to transmit a first upstream optical signal towards the OLT using time-division multiple access (TDMA), wherein the first upstream optical signal comprises a third band, wherein the first upstream optical signal is centered at a wavelength, wherein the second ONU is further configured to transmit a second upstream optical signal towards the OLT using TDMA, wherein the second upstream optical signal comprises a fourth band and a fifth band, wherein the second upstream optical signal is centered at the wavelength, and wherein the OLT is further configured to receive the first upstream optical signal and the second upstream optical signal at different times via the TDMA.

20. The PON of claim 18, wherein the first ONU is further configured to transmit a first upstream optical signal towards the OLT, wherein the first upstream optical signal comprises a third band, wherein the first upstream optical signal is centered at a first wavelength, wherein the second ONU is further configured to transmit a second upstream optical signal towards the OLT using time-division multiple access (TDMA), wherein the second upstream optical signal comprises a fourth band and a fifth band, and wherein the second upstream optical signal is centered at a second wavelength.

21. The PON of claim 18, wherein the first equalizer is further configured to further equalize, independent of a band separator, only the first band.

* * * * *